United States Patent [19]

Clendenin

[11] 3,995,090

[45] Nov. 30, 1976

[54] PAPER CORE STOCK HAVING POLYVINYL ACETATE ADDITION BEFORE CORE IMPREGNATION

[75] Inventor: William H. Clendenin, Coshocton, Ohio

[73] Assignee: General Electric Company, Schenectady, N.Y.

[22] Filed: Jan. 10, 1975

[21] Appl. No.: 540,014

Related U.S. Application Data

[63] Continuation of Ser. No. 316,576, Dec. 19, 1972, abandoned.

[52] U.S. Cl. .............................. 428/355; 427/391; 428/333; 428/500; 428/501; 428/525; 428/531; 260/17.4 BB; 260/17.4 ST

[51] Int. Cl.² .......................................... C09J 7/02

[58] Field of Search ........... 428/355, 514, 333, 500, 428/501, 525, 531; 427/391; 260/17.4 BB, 17.4 ST

[56] References Cited

UNITED STATES PATENTS

| | | | |
|---|---|---|---|
| 2,956,902 | 11/1960 | Greif | 428/501 X |
| 3,620,899 | 11/1971 | Kelly et al. | 260/17.4 ST X |
| 3,632,535 | 1/1972 | Gramera et al. | 156/328 |
| 3,661,696 | 5/1972 | Knutson | 428/514 X |

*Primary Examiner*—P. C. Ives

[57] ABSTRACT

The addition of polyvinyl acetate to the core stock impregnating resin solution makes possible the preparation of relatively thin but yet strong plastic laminates which are also characterized by ready adhesion with contact adhesive without preparatory sanding and with only light sanding or roughening using less expensive adhesives. The materials so treated are also non-blocking.

5 Claims, No Drawings

PAPER CORE STOCK HAVING POLYVINYL ACETATE ADDITION BEFORE CORE IMPREGNATION

This is a continuation of application Ser. No. 316,576, filed Dec. 19, 1972, now abandoned.

This invention relates to plastic laminates which are prepared by laying up and consolidating under heat and pressure a plurality of thermosetting resin-impregnated paper layers. It particularly relates to such laminates which have superimposed thereon a resin-impregnated print sheet and, optionally, a resin-impregnated protective overlay sheet or surface layer. More specifically, it relates to such plastic laminates which, while relatively thinner than usual, are still flexible and strong by reason of the addition to the impregnating resin for the core stock of polyvinyl acetate. Such polyvinyl acetate addition also makes possible the adherence of the laminate to substrates using contact adhesive without the usual preparatory sanding of the surface layer of core stock and with or by light sanding using less expensive adhesives.

Plastic laminates prepared from superimposed layers of paper pre-impregnated with thermosetting resins and consolidated under heat and pressure are well known. Generally speaking, such laminates consist of a number of resin-impregnated core layers which may have superimposed thereon a print paper for decorative purposes. In many cases the decorative or print layer is overlaid with a protective layer which is relatively transparent so that the print or design can be seen through the protective layer. Typically, the core layers are of ordinary or creped kraft paper which can be impregnated with any of a number of thermosetting resins. Preferred and most generally used is a condensation product of a phenol and an aldehyde, more particularly, an alkali catalyzed phenol formaldehyde condensation product typified by Resinox 470 manufactured by the Monsanto Company. Generally, the resin content of the core paper ranges from about 25 to 29 percent by weight for ordinary kraft paper and from about 34 to 37 percent by weight of resin for a normally used creped kraft paper. The print paper is usually impregnated with a thermosetting resin which is characterized by resistance to discoloring and wear and which also has translucent or transparent properties. While any of a number of resins can be used for this purpose, modified melamine formaldehyde products are particularly useful. An example of such a melamine formaldehyde resin is Cymel 428 manufactured by American Cyanamid. This resin is a white, free-flowing powder, specifically designed for the purpose and is readily soluble in water or in alcohol-water solutions, giving a clear, colorless solution which is stable for several days at 50 percent solids content. When an overlay sheet or protective layer is used in addition to the print sheet, it is generally of a high purity, highly translucent alpha cellulose paper, rayon paper and the like, which is treated with the same resin as the print paper to a resin content of about 60 to 65 percent by weight. The resin impregnated core sheets as well as the print sheet and overlay paper, if any, are dried without substantially advancing the cure of their impregnating resin and laid up in the desired number with one overlay paper and one print sheet layer to a number of core layers, the whole being then cured in the usual manner as by placing between polished steel panels at times varying from about 20 to 25 minutes at from 130° to 150° C at pressures ranging from 1000 psi to 1500 psi, the laminates then being cooled, still under pressure, to below about 40° C and removed from the press. It will, of course, be obvious that in place of the overlay paper, a resin solution containing abrasion-resistant materials can be used or such material included in the overlay. Normally the thinnest laminates which can be prepared without special care against breakage are about 0.028 inch thick consisting of three layers of 11 mil thick core stock, a print layer having an initial thickness of about 4 mils and an overlay paper having an initial thickness of about 2 mils to give a finished product of the above thickness. The fragility of thinner laminates due to brittleness in preparation and handling has been a disadvantage of such laminates since they are normally adhered to or fixed to a backer material such as metal, plywood, cardboard, particle board, chipboard and the like, and it is a primary object of the present invention to prepare relatively thinner laminates which can be handled and stored and used without undue care, such laminates also unexpectedly being characterized by ready adhesion to substrates through the medium of contact adhesive without preparatory sanding. When less expensive adhesives such as the urea formaldehydes, white glue such as polyvinyl acetate materials, phenol formaldehyde adhesives and those prepared from epoxies, asphalts, coal tars and animal materials are used, light sanding is required. However, the flexibility imparted to the laminate by this invention eliminates losses due to breakage during such sanding.

Those features of the invention which are believed to be novel are set forth with particularity in the claims appended hereto. The invention will, however, be better understood and further advantages and objects thereof appreciated from a consideration of the following description.

It has unexpectedly been found that adding to the core stock phenolic impregnating resin of from about three to five percent by weight of polyvinyl acetate solids material as described below enables the production of very thin decorative laminates by the reduction of the number of layers of core stock which are still relatively flexible and resistant to breakage, laminates of the order of about 0.016 inch in thickness being possible as opposed to normal laminates which are usually at least 0.028 inch thick. It has also unexpectedly been found that such laminates are readily adherable to substrates with contact adhesives without preparatory sanding of the rearmost core stock surface which is to be cohered and with light sanding using less expensive adhesives. The kraft or other paper so treated does not block either as wraps in a roll or sheets in a pile.

Any of a number of polyvinyl acetate materials can be used and readily incorporated into the phenolic core stock impregnating material. Preferred is polyvinyl material having an average molecular weight of about 200,000 to 220,000. Particularly useful is a solution of polyvinyl acetate consisting of 5 parts by weight of polyvinyl acetate having an average molecular weight of $1.5 \times 10^6$ along with 95 parts by weight of polyvinyl acetate having an average molecular weight of $1.4 \times 10^5$, the final mix having a molecular weight of 208,000. Polyvinyl acetate is readily soluble in alcoholic and ketone type solvents, a particular preparation consisting of the above combination of polyvinyl acetate along with 150 parts by weight of acetone, 50 parts by weight of methyl cellosolve and 3 parts by weight of water. The polyvinyl acetate solution can, if desired, be kept as a stock solution and added to the phenolic or other impregnating varnish just before it is used, the polyvinyl acetate solution simply being added to the phenolic material with stirring. The core stock such as kraft paper is treated with the combination impregnating resin solution or varnish in the usual way as by dipping, brush or otherwise coating and impregnating the core stock being dried and typically having a 27 percent resin content. The core stock sheets so prepared are laid up in the desired number in combination with a print sheet and overlay sheet or, if desired, an overlay protective coating solution and placed under heat and pressure. In a typical example, two plies of kraft paper impregnated with the above combination solution in which 303 pounds of polyvinyl acetate solution containing 100 pounds of the above 5 percent and 95 percent mixture of polyvinyl acetate preparation were added to 2410 pounds of alkali catalyzed phenolic resin, were laid up with a pre-impregnated and dried print sheet and overlay sheet, the whole being placed between stainless steel plates and cured for 20 minutes at a temperature of 135° to 140° C and 1050 psi, the plies being cooled to about 40° C before removal of the finished laminate. Even though the laminate was only about 0.020 inch thick, it could be handled in the same manner as much thicker, normally prepared laminates of the order of about 0.028 inch and thicker without breakage. The laminate so prepared was adhered readily to a particle board substrate using contact adhesive. The enhanced or improved flexibility of these laminates allows them to be sanded or roughened sufficiently so that they can be adhered with the less expensive adhesives or glues.

When polyvinyl acetate beads having a molecular weight of 32,000 were used to prepare a solution using the above procedure, the material treated as above blocked to such an extent that a roll of it could not be unrolled for sheeting.

When a solution prepared as above but wholly with polyvinyl acetate beads having a molecular weight of $1.4 \times 10^5$, the core stock treated as above was difficult to sheet because of blocking in the roll and sheets of it blocked in a pile causing unacceptable processing losses.

By the practice of the present invention, there are provided relatively thin laminates with corresponding savings in core stock material and resin impregnant and without loss in physical characteristics and resistance to breakage in handling. As pointed out above, the laminates so prepared are also readily adherable without special treatment to the usual substrates using contact adhesive. With only light sanding or roughening of these very thin, flexible laminates, the less expensive adhesives can be utilized.

What I claim as new and desire to secure by Letters Patent of the United States is:

1. Relatively thin, strong, flexible, non-blocking, high pressure and temperature consolidated plastic laminate comprising thermosetting phenol aldehyde resin impregnated paper core stock in which the resin impregnant has added thereto before impregnation of the core, additive consisting essentially of polyvinyl acetate having an average molecular weight of from about 200,000 to 220,000, said polyvinyl acetate additive being from about 3 to 5 percent by weight based on the weight of the resin impregnant.

2. A laminate as in claim 1 in which said polyvinyl acetate has an average molecular weight of about 208,000.

3. A laminate as in claim 1 in which said polyvinyl acetate addition is about 4 percent by weight of the resin impregnant.

4. A laminate as in claim 1 in which said polyvinyl acetate consists of by weight about 95 parts of polyvinyl acetate having a molecular weight of about $1.4 \times 10^5$ and 5 parts of polyvinyl acetate having a molecular weight of about $1.5 \times 10^6$.

5. The process of making a plastic laminate as in claim 1 which comprises adding to the core stock resin impregnant from about three to five percent by weight of polyvinyl acetate based on the weight of the resin impregnant, said polyvinyl acetate having an average molecular weight of from about 200,000 to 220,000.

* * * * *